(12) United States Patent
Adachi

(10) Patent No.: US 7,889,282 B2
(45) Date of Patent: Feb. 15, 2011

(54) DIGITAL TELEVISION

(75) Inventor: Kazuteru Adachi, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 1105 days.

(21) Appl. No.: 11/634,136

(22) Filed: Dec. 6, 2006

(65) Prior Publication Data

US 2007/0132891 A1 Jun. 14, 2007

(30) Foreign Application Priority Data

Dec. 9, 2005 (JP) ............................. 2005-355598

(51) Int. Cl.
*H04N 5/46* (2006.01)
(52) U.S. Cl. ...................... 348/738; 348/678; 348/736
(58) Field of Classification Search ................ 348/738, 348/736, 678, 725, 726, 462, 553–555, 473, 348/705–707, 565; 725/127, 128, 38, 151, 725/139; *H04N 5/46, 5/60*
See application file for complete search history.

(56) References Cited

U.S. PATENT DOCUMENTS 6,147,713 A * 11/2000 Robbins et al. ............. 348/555
6,476,878 B1 * 11/2002 Lafay et al. ................. 348/738
6,678,011 B2 * 1/2004 Yanagi et al. ............... 348/725
6,903,781 B2 * 6/2005 Tanigawa et al. ............ 348/565
7,039,941 B1 * 5/2006 Caporizzo et al. ........... 725/127
7,692,726 B1 * 4/2010 Greenberg .................. 348/725

FOREIGN PATENT DOCUMENTS

JP 08-289224 11/1996

* cited by examiner

*Primary Examiner*—Trang U Tran
(74) *Attorney, Agent, or Firm*—Pillsbury Winthrop Shaw Pittman, LLP

(57) ABSTRACT

A digital television combination integrated circuit is employed which includes a video signal D/A converter which converts a digital video signal to an analog video signal, and an audio signal D/A converter which converts a digital audio signal to an analog audio signal; there are provided a level shift circuit which extracts a luminance signal in the video signal which is outputted from the video signal D/A converter, and a low pass filter which extracts the DC component of the output signal of this level shift circuit; and the output signal of this low pass filter is supplied as a control voltage signal for gain control of an audio amplification circuit.

2 Claims, 4 Drawing Sheets

DIGITAL TELEVISION

CROSS REFERENCE

This Nonprovisional application claims priority under 35 U.S.C. §119(a) on Patent Application No. 2005-355598 filed in Japan on Dec. 9, 2005, the entire contents of which are hereby incorporated by reference.

BACKGROUND OF THE INVENTION

The present invention relates to a digital television comprising a digital television combination integrated circuit, including a video signal D/A converter which converts a digital video signal into an analog video signal.

Along with the spreading of digital television systems in recent years, the integration of the circuitry which makes up digital television receivers has steadily progressed.

In the past, the circuitry in a digital television was built using separate integrated circuits adapted for various types of signal processing, but recently it has been possible to perform these various types of signal processing with a single integrated circuit. For example, a digital television combination integrated circuit is in use, which processes both a digital video signal and a digital audio signal.

On the other hand, a device which performs signal processing upon the video signal and the audio signal while associating them together organically is disclosed in Japanese Laid-Open Patent Publication H08-289224. The audio amplification circuit disclosed in this publication is one with which an audio output is obtained which is suited to the human visual and auditory senses, by controlling the level of amplification and the frequency characteristics of the audio signal based upon the video information.

Although, by employing the above described digital television combination integrated circuit, the total number of components in the digital television is reduced, and it can be built more compactly, thus reducing its cost, nevertheless, since this type of combination integrated circuit is one which is used by a plurality of manufacturers, therefore a large number of functions for enhancing its general utility as a component are included in advance. However, when building a circuit according to the requested specification for a digital television, sometimes functions which are necessary for this specification are not included, and naturally, in such a case, it has been necessary to build up the circuit by using other integrated circuits in parallel.

For example, when building a circuit in which, in order to adjust the sound volume, the audio signal is converted into an analog audio signal by being PWM modulated and then passed through a low pass filter, then it is necessary to provide the PWM modulation circuit and the low pass filter or the like as separate dedicated components, and this constitutes an obstruction to reduction of the cost. Moreover, with a circuit in which the control of the sound volume is performed by the above described PWM duty ratio, generally the stability of the temperature characteristic is low, and it is difficult to adjust the sound volume with high accuracy. Furthermore, although it is possible to provide a ladder resistor externally, and to employ a circuit which performs adjustment of the sound volume by changing the voltage division ratio provided by this resistance, with this simple circuit it is only possible to change the sound volume stepwise, so that there has been the problem that it has not been possible to adjust the sound volume substantially continuously.

Due to this, it is often impossible to utilize some among the large number of functions which are provided in advance within such a combination integrated circuit in an effective manner, and moreover it sometimes becomes necessary to provide separate components externally in order to build up the circuitry which is required; and this state of affairs is a problem which must be solved if it is contemplated to make a digital television more compact and to reduce its cost.

It should be understood that, with the audio amplification circuit disclosed in the above Japanese Laid-Open Patent Publication H08-289224, only processing while organically associating the video signal and the audio signal is contemplated, and making the system as a whole more compact and reducing its cost are not taken into account, so that this prior art is not one which can solve the problems described above.

The object of the present invention is to provide a digital television with which a reduction in the number of component parts may be anticipated, whereby, along with reducing the size of the substrate, it is also possible to make the overall structure lighter and more compact, thus reducing the cost.

SUMMARY OF THE INVENTION

A digital television according to the present invention includes a digital television combination integrated circuit including a video signal D/A converter which converts a digital video signal to an analog video signal, and an audio signal processing circuit which performs processing upon an audio signal according to a control voltage, and which further includes: a level shift circuit which inputs the video signal outputted from the video signal D/A converter, and eliminates a synchronization signal portion included in the video signal, thus extracting a luminance signal portion; and a filter circuit which inputs the output signal of the level shift circuit, and, along with extracting the low frequency component of the input signal, also outputs the result to the audio signal processing circuit as a control voltage signal.

DETAILED DESCRIPTION OF THE INVENTION

A digital television according to an embodiment of this invention will now be explained with reference to FIGS. 1 through 4.

Figure 1:
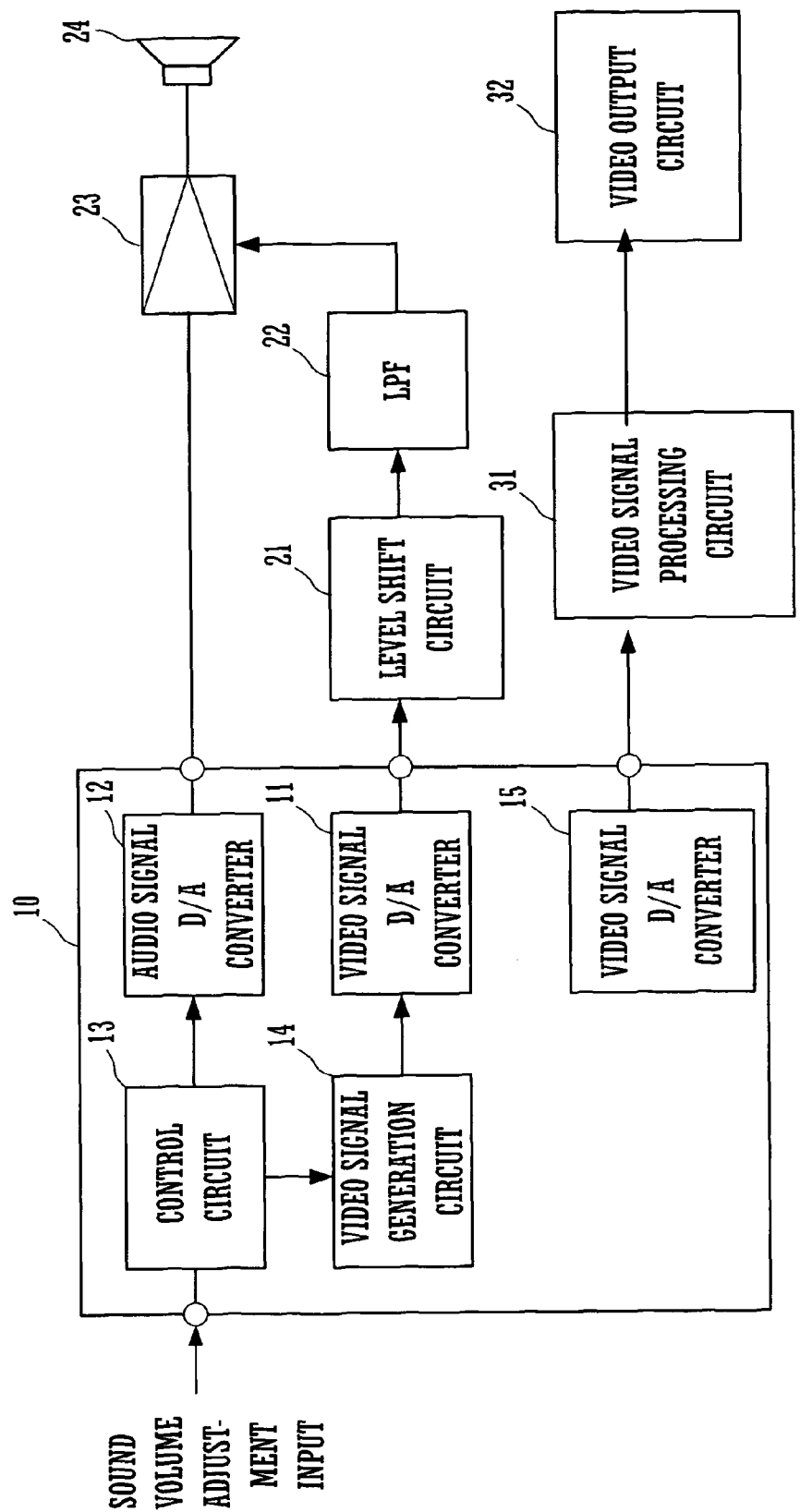
FIG. 1 is a block diagram showing the structure of the main portion of a digital television according to an embodiment of the present invention.

FIG. 1 is a block diagram showing the structure of the main portion of a digital television to which the present invention has been applied. Interior to a combination integrated circuit for a television 10, there are provided video signal D/A converters 11 and 15, an audio signal D/A converter 12, a video signal generation circuit 14, and a control circuit 13. Of course many other circuits are also included, but these are not shown in the figure.

The video signal D/A converters 11 and 15 both convert their respective digital video signals to analog video signals, and in this manner video signal circuits upon the usual plurality of systems are provided. The audio signal D/A converter 12 converts a digital audio signal to an analog audio signal and outputs it externally. The video signal generation circuit 14 supplies to the video signal D/A converter 11 a video signal whose luminance corresponds to control from a control circuit 13. The control circuit 13 supplies a digital audio signal to the audio signal D/A converter 12, and outputs a control signal to the video signal generation circuit 14.

The video signal D/A converter 15 outputs a first video signal (a video signal for a primary screen); the video signal processing circuit 31 subjects this analog video signal which is outputted from the D/A converter 15 to predetermined processing; and the video output circuit 32 displays the resulting signal as an image. Of course, a circuit structure would also be acceptable in which the digital video signal is extracted from the digital television combination integrated circuit 10, and video output is performed by digital processing.

The video signal D/A converter 11 outputs a second video signal (a video signal for a secondary screen), and a level shift circuit 21, which comprises a diode or the like which cuts the negative voltage of the video signal outputted by the video signal D/A converter 11, eliminates the synchronization signal portion in the video signal and thereby extracts the luminance signal portion. Here, supposing that 0 V is taken as a reference for the video signal, a positive voltage luminance signal and a negative voltage synchronization signal are superimposed therein, and this level shift circuit 21 performs a level shift by cutting the negative voltage portion thereof (the synchronization signal portion), so that the luminance signal portion is extracted.

The low pass filter 22 extracts the low frequency component (the DC component) of the luminance signal of the video signal which is outputted from the level shift circuit 21, and supplies it to the audio amplification circuit 23 as a control voltage signal for gain control. This low pass filter 22 eliminates the components of frequency greater than or equal to the vertical scan frequency, and generates an approximately DC voltage signal corresponding to the luminance signal portion of the video signal.

And the audio amplification circuit 23 is a circuit which amplifies the analog audio signal which is outputted from the audio signal D/A converter 12 within the digital television combination integrated circuit 10, and thereby drives the speaker 24. The gain of this audio amplification circuit 23 corresponds to the voltage value of the control voltage which is outputted from the above described low pass filter 22.

Figure 2A:
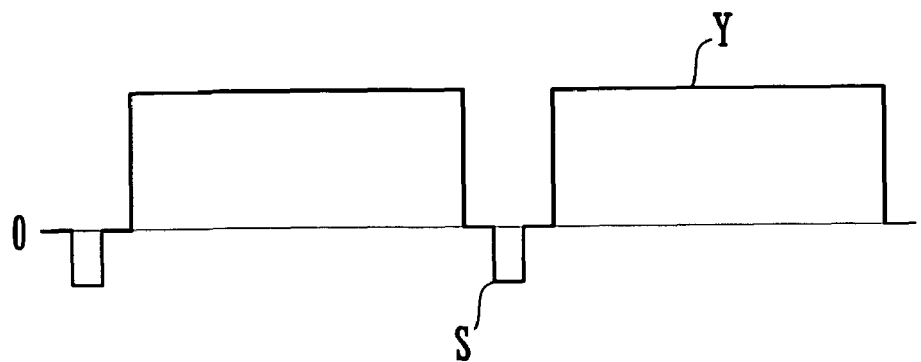
FIGS. 2A to 2C are waveform diagrams showing the operation of a level shift circuit and a low pass filter of FIG. 1.
Figure 2B:
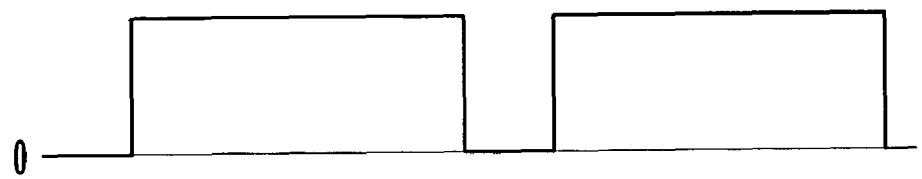
Figure 2C:
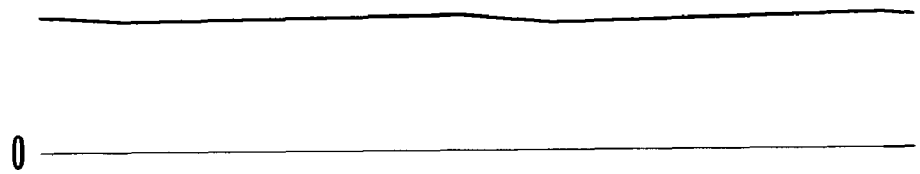

FIGS. 2A to 2C are waveform diagrams showing the operation of the level shift circuit 21 and the low pass filter 22 shown in FIG. 1. FIG. 2A is the video signal which is outputted from the video signal D/A converter 11, FIG. 2B is the voltage waveform of the signal which is outputted from the level shift circuit 21, and FIG. 2C is the voltage waveform of the signal which is outputted from the low pass filter 22.

As shown by FIG. 2A, the image signal includes a negative voltage synchronization signal S and a positive voltage luminance signal Y. This synchronization signal S portion is eliminated by the level shift circuit 21 as shown by FIG. 2B, so that only the signal which oscillates towards the positive side is level shifted. By this signal passing through the low pass filter 22, it is outputted as a DC voltage signal corresponding to the voltage level of the luminance signal Y, as shown by FIG. 2C.

Figure 3:
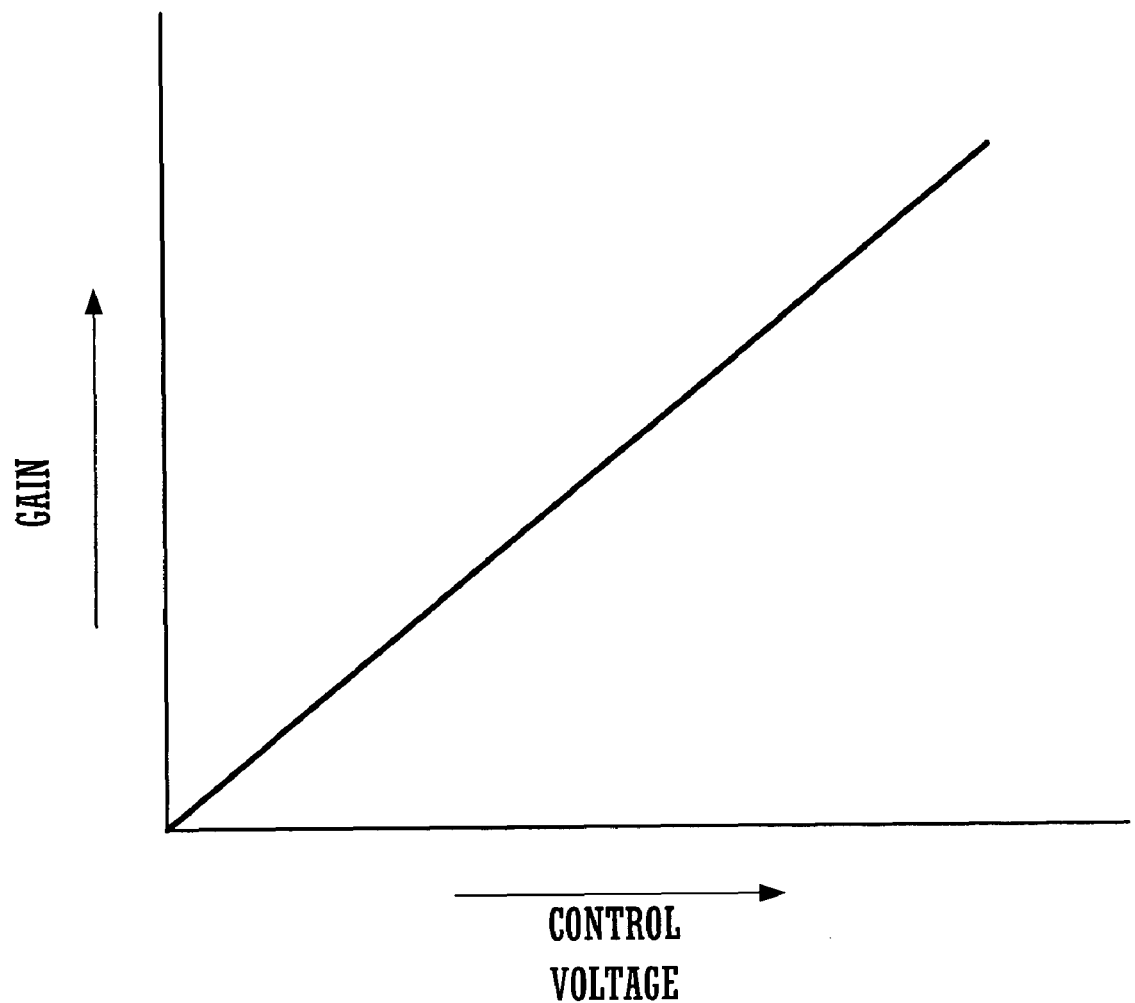
FIG. 3 is a figure showing the characteristics of an audio amplification circuit of FIG. 1.

FIG. 3 is a figure showing the relationship of the gain relative to the control voltage of the audio amplification circuit 23 shown in FIG. 1. In this example, the control voltage and the gain are in an approximately proportional relationship. Accordingly, the gain changes linearly in correspondence to the control voltage which is inputted.

Figure 4:
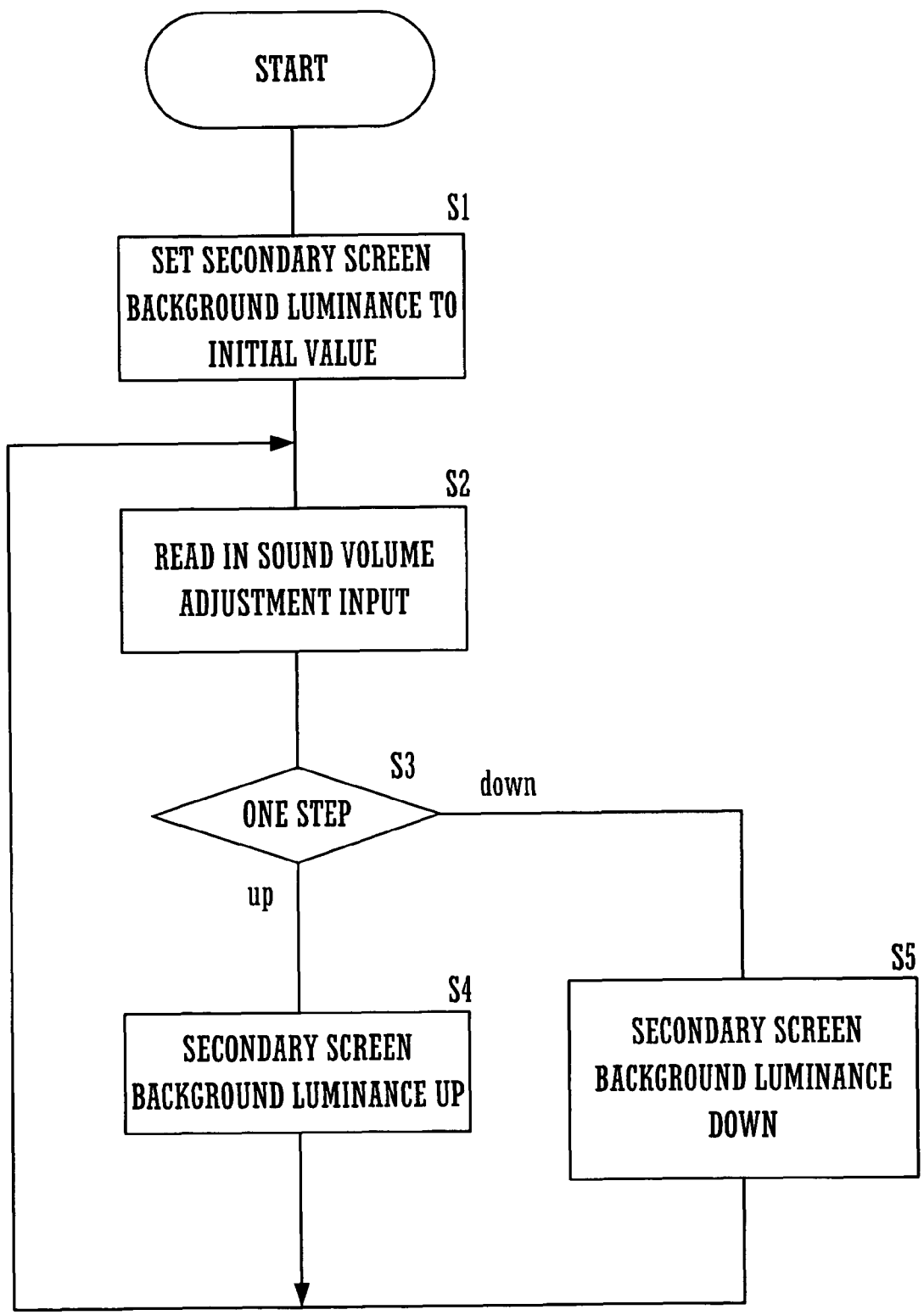
FIG. 4 is a figure showing the details of processing performed by a control circuit of FIG. 1 as a flow chart.

FIG. 4 is a figure showing the details of processing performed by the control circuit 13 of the digital television combination integrated circuit shown in FIG. 1 as a flow chart. First, the value of the background luminance for the secondary screen is set to an initial value (step S1). The video signal D/A converter 11 shown in FIG. 1 is a circuit for outputting the video signal for the secondary screen, while the control circuit 13 controls the video signal generation circuit 14 so that it generates a video signal such that its background luminance corresponds to the above described initial value.

Thereafter, the sound volume adjustment input is read in (step S2), and processing is performed according to this input.

If the sound volume adjustment input is inputted elevated by one step, then the background luminance for the secondary screen is elevated by one step (steps S3 to S4). By doing this, the luminance of the video signal generated from the video signal generation circuit 14 shown in FIG. 1 is increased by one step. As a result, the luminance level of the analog video signal which is outputted from the video signal D/A converter 11 is elevated by one step, and the voltage of the control voltage signal which passes through the level shift circuit 21 and the low pass filter 22 and is finally supplied to the audio amplification circuit 23 is elevated by one step. As a result, the sound volume is increased by one step.

If a sound volume adjustment input which has been reduced by one step is inputted, then the background luminance for the secondary screen is reduced by one step (steps S3 to S5). By doing this, just conversely to the case described above, the voltage of the control voltage signal supplied to the audio amplification circuit 23 is reduced by one step, so that the sound volume is reduced by one step.

Although, in the example described above, it was arranged to adjust the sound volume one step at a time, it would also be acceptable to arrange to perform processing according to a signal being inputted indicating the sound volume by some other method. For example it would also be possible, if a signal which commands muting is inputted, to set the above described secondary screen background luminance to minimum.

By doing as above, it is possible to take advantage of the video signal D/A converter 11, the video signal generation circuit 14, and the control circuit 13 within the digital television combination integrated circuit 10 in an effective manner for adjusting the sound volume, and it is not necessary to provided any new circuit for adjusting the sound volume externally to the digital television combination integrated circuit 10. Although, in the example shown in FIG. 1, the level shift circuit 21 and the low pass filter 22 were newly provided for adjustment of the sound volume, nevertheless, since these circuits are extremely small in scale and can be built from very few components, accordingly the present invention is extremely effective from the point of view of making the device more compact and reducing its cost, as compared to the case of, for example, providing a D/A converter externally to the integrated circuit 10.

It should be understood that although, in the embodiment disclosed above, an example was shown in which the main portion of a circuit for adjusting the sound volume of the audio signal was built up from circuits interior to the digital television combination integrated circuit 10, since the output signal of the low pass filter 22 is an analog voltage signal, accordingly this analog voltage signal can be taken advantage of generally by any audio signal processing circuit, by being inputted as a control voltage signal. For example, if a tone control circuit is provided which controls the frequency characteristics of the audio signal according to a control voltage, and a circuit is constructed which supplies the output signal of the above described low pass filter 22 to this tone control circuit, then it is possible to perform tone control in the same manner as in the case of adjusting the sound volume, described above.

Finally, in the above described explanation of an embodiment of the present invention, all of the features are shown by way of example, and should not be considered as being limitative of the present invention. The scope of the present invention is not to be defined by any of the features of the embodiment described above, but only be the scope of the appended Claims. Moreover, equivalents to elements in the Claims, and variations within their legitimate and proper scope, are also to be considered as being included within the range of the present invention.

What is claimed is:

1. A digital television, comprising:
    a digital television combination integrated circuit, including a video signal D/A converter which converts a digital video signal to an analog video signal;
    an audio signal processing circuit which performs processing upon an audio signal according to a control voltage;
    a level shift circuit which inputs the video signal outputted from the video signal D/A converter, and eliminates a synchronization signal portion included in the video signal, thus extracting a luminance signal portion; and
    a filter circuit which inputs the output signal of the level shift circuit, and, along with extracting a low frequency component of the luminance signal, also outputs the result to the audio signal processing circuit as a control voltage signal.

2. A digital television as described in claim 1, further comprising an audio signal D/A converter within the digital television combination integrated circuit,
    wherein the audio signal processing circuit is an audio amplification circuit which amplifies the analog audio signal outputted from the audio signal D/A converter by a gain which corresponds to the control voltage.

* * * * *